April 27, 1937.    F. G. RICHARDSON    2,078,411
CLINCH-ON NUT
Filed July 5, 1935

INVENTOR.
Frederick G. Richardson
BY
Barnes, Kisselle, Laughlin & Raisch
ATTORNEYS Patented Apr. 27, 1937

2,078,411

UNITED STATES PATENT OFFICE 2,078,411

CLINCH-ON NUT

Frederick G. Richardson, Detroit, Mich., assignor to F. L. McLaughlin Company, Detroit, Mich., a corporation of Michigan Application July 5, 1935, Serial No. 29,854

3 Claims. (Cl. 85—32)

This invention relates to clinch-on nuts, of the type adapted to be anchored in fixed position. More specifically, it has to do with improvements on clinch-on nuts of the cage type as shown in the patent to Mitchel No. 1,761,358 of June 3, 1930.

In fabricating and assembling clinch-on nuts it has been the practice to enclose a standard commercial nut with a sheet metal cage; in this type of clinch-on nut it has not only been customary to have a snug fit between the nut and the cage but in forming the cage around the nut and clinching the nut into the sheet metal part, the nut has been firmly locked in position so that operatively the common nut and cage become an integral part.

Inasmuch as the apertures in the two sheet metal parts, for receiving the clinch-on nut and the bolt, are frequently out of alignment, and if not originally out of alignment later become out of alignment because of the relative movement of the sheet metal parts, difficulty has often been encountered in the original assembling of the nut and later on squeaks frequently develop because of the unequal strain placed upon some of the fixed parts.

It is the object of the present invention to provide a cage type clinch-on nut wherein the common standard nut may be used as heretofore but it has a floating relation with respect to the cage whereby to adjust itself to unaligned apertures and to permit subsequent shifting so as to in a measure eliminate sheet metal squeaks in the territory of the clinch-on nuts.

Other features have to do with the detailed construction of the cage so as to insure a positive floating of the nut within the cage before and after the clinch on operation.

In the drawing:

Fig. 11 is a plan view of a modified form of blank structure.

Fig. 12 is a plan view of the same structure after assembly, only two sides of the nut being completely closed in.

Figures 11, 12:
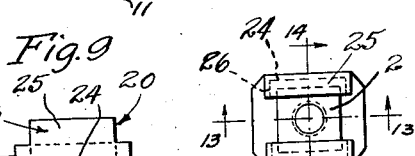
Figures 10, 13:
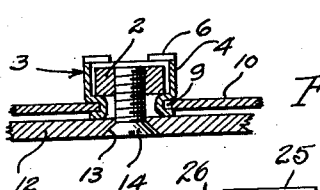
Fig. 10 is a sectional view similar to Figs. 8 and 9 but illustrating the securing together of two sheet metal plates by means of a bolt and a clinch-on nut.
Figure 14:
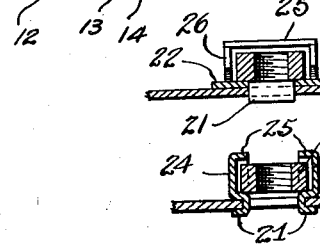

Figs. 13 and 14 are sectional views taken on lines 13—13 and 14—14, respectively, of Fig. 12, illustrating the floating arrangement between the nut and the cage.

The basic element of the clinch-on nut forming the present invention is a standard or common nut 2. Regardless of what form the clinch-on nut is there must be a threaded portion to receive the bolt to perform the tightening operation; by using a common standard nut the cost of the threaded element is reduced to a minimum.

Figure 1:
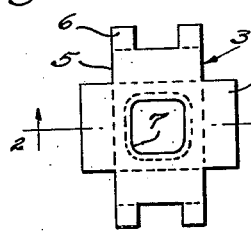
Fig. 1 represents one form of stamped out sheet metal blank used in the first step in the fabrication of the cage.
Figure 3:
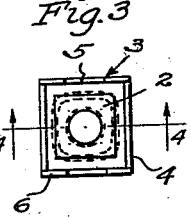
Figs. 3 and 4 are plan and sectional views respectively illustrating the second step in the fabrication of the clinch-on nut and showing the side walls of the cage turned upwardly and a common standard nut positioned in place.

Instead of forming a sheet metal cage around the nut of substantially the same size as the nut, I preferably form a cage generally designated 3 which provides appreciable space around the four sides of the nut, as clearly shown in Fig. 3. This cage is formed from a flat sheet of metal stamped out as shown in Fig. 1, wherein two of the side walls 4 are plain and the other side walls 5 are formed with small extensions 6. The center of the blank is punched out and extruded as at 7 to form the clinch on portion of the cage. It will be understood that the sheet metal blank as shown in Fig. 1 may be in the form of a strip or otherwise to permit of easy and inexpensive assembly, details of which are not pertinent to the present invention.

Figure 5:
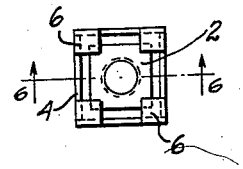
Figs. 5 and 6 are plan and sectional views respectively illustrating the final step wherein a portion of the side walls are turned over in a manner to seat upon other side walls so as to insure vertical spacing as well as horizontal spacing around the nut.
Figure 2:
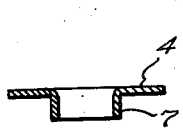
Fig. 2 is a sectional view taken on line 2—2 of Fig. 1 illustrating particularly the extruded portion used in the clinch on operation.
Figure 4:
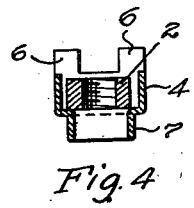
Figure 6:
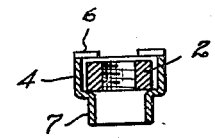
Figure 7:
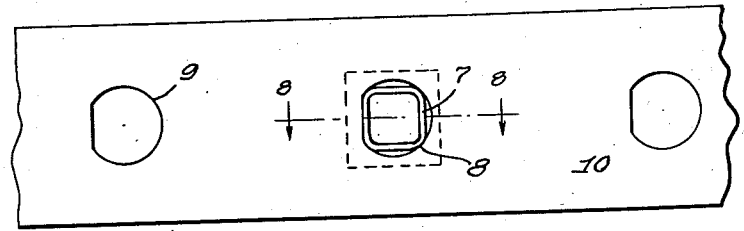
Fig. 7 illustrates a strip of sheet metal provided with punched out D shaped apertures and also showing the extruded portion of the clinch-on nuts positioned in one of the apertures.

Regardless of the method of automatic assembly, the side walls 4 and 5 are turned up as shown in Figs. 3 and 4 so as to provide appreciable space between each of the walls of the nut and the walls 4 and 5. In the next operation the extensions 6 are turned over so as to be substanially parallel with the plane of the nut. It will be noticed that in turning up the side walls, the second operation as shown in Fig. 3, the side walls 4 are positioned within the ends of the side walls 5, with the result that when the extensions 6 are turned over, as shown in Figs. 5 and 6, the bottom part of these extensions will contact with the side walls 4. This step is a very important one because the side walls 4 act as stops for the member 6 thus insuring a definite space between the nut and the enclosure members 6.

The extruded portion 7 preferably has rounded corners as at 8 so that this extruded portion may be positioned within the standard type D shaped aperture 9 in any one of four positions. It will be understood that the aperture for receiving the clinch on portion 7 may vary in shape and that the D shaped apertures are standard at the present time. All that is necessary is that one surface of the aperture has a flat contact with one of the walls of the extruded portion 7 so that the cage, and the nut, are prevented from turning.

Figure 8:
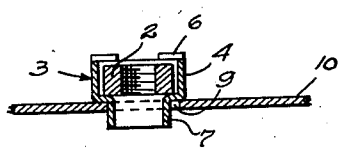
Fig. 8 is a sectional view taken on line 8—8 of Fig. 7 illustrating the first step in inserting the clinch on cage into the D shaped aperture.
Figure 9:
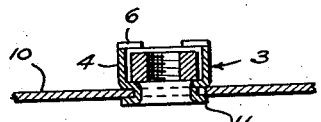
Fig. 9 is a view similar to Fig. 8 illustrating the extruded part of the cage turned over into clinch on position.

In assembling the clinch-on nut, the extruded portion 7 is inserted through the aperture 9 of a sheet metal member 10, as best shown in Fig. 8; next the clinch-on nut is subjected to a stamping operation whereby pressure is applied to the top members 6 and the clinch on portion 7 so as to clinch the same over as at 11 in Fig. 9. It will be understood that hundreds of these clinch on nuts are used in every automobile body and that the operation is a very fast and speedy one; therefore the dies contacting with the top and bottom of the clinch-on nut usually have quite an impact force and operate very fast. If it were not for the side walls 4 there would be a tendency for the top portions 6 to be squeezed against the nut, and clamping the nut frictionally in position would nullify any benefit that would be obtained from the horizontal floating relationship between the nut and the side walls. In other words, the nut must have vertical as well as horizontal clearance, and the side walls 4 insure this.

In the final assembly operation another sheet metal strip or panel 12 is stamped out so that the apertures 13 thereof are supposedly in alignment with the apertures 9 formed in the other sheet metal strip. However, in large assembly oprations these apertures are often slightly out of alignment. Inasmuch as the nut 2 floats within the cage 3, it will be seen that when the bolt 14 is inserted in place to clamp together the two sheet metal parts 10 and 12 that the nut 2 may have considerable shifting in any direction so as to compensate for any misalignment between the apertures 9 and 13. Any strains upon the two parts 10 and 12 caused by the automobile hitting depressions or obstructions in the roadway or in going around a corner will be taken up by the floating nut and thus eliminate the rather annoying squeaks which heretofore have been quite prevalent in many types of body construction. Even though there should be no movement after the two parts 10 and 12 have been clamped in position, nevertheless there will have been alignment before the tightening of the bolt 14 so that all buckling or undue strain will be eliminated. The forcing home of the bolt into a fixed position standard clinch-on nut which is slightly out of alignment causes this buckling which often results in annoying squeaks at the point where the two sheets are slightly buckled or under strain.

A modified form of the invention is illustrated in Figs. 11 to 14. The main distinction between this modification and that disclosed in Figs. 1 to 10 is that only two sides of the standard nut 2 are completely enclosed by the cage. In this modification the blank 20 is formed as shown in Fig. 11, the clinch-on portions 21 being stamped out instead of extruded, the main body 22 being formed and left flat and the two end walls 23 each being shaped to provide a side wall 24, a top enclosing wall 25 and short side wings 26. In assembling this modification the two end wings represented by the end walls 24 may be turned up vertically, the side walls 26 turned inwardly, as shown in Fig. 12, and the top portion 25 then turned over so as to be in a plane parallel to the top of the nut 2. Thus the side walls 26 support the top turned over portion 25 to prevent the top 25 from being crushed down on top of the nut. The side walls 24 and the inturned portions 26 are spaced laterally in both directions from the nut so as to permit of movement in any direction. In Fig. 13 the stamped out portions 21 are shown as turned over to clinch the nut in position on a plate member 27.

What I claim is:

1. As a new article of manufacture, a nut unit of the type adapted to be permanently clinched in an aperture in a sheet metal article, comprising a substantially square standard nut element for receiving a bolt, and an exterior member having fixed walls enclosing a portion of the top and bottom walls and side walls of the nut, said exterior member having a portion non-rotatably cooperating with said aperture in said sheet metal article and being permanently distorted to serve as the sole means for clinching the nut unit in position, said fixed walls having such predetermined dimensions as to permit shifting of the nut within said exterior member, the portion of the exterior member enclosing a portion of the top wall of the nut being directly backed by a top edge of said exterior member enclosing a portion of the side walls of the nut to prevent said top enclosing portion from collapsing when said portion cooperating with the aperture in the sheet is distorted.

2. Fastening structure of the class wherein a nut is attached to a sheet of metal for reception of a bolt, comprising a threaded nut member enclosed within a sheet metal casing, a portion of said casing extending at right angles to the plane of the nut, said sheet of metal being provided with an aperture for receiving the extending portion of the casing, said sheet metal casing and nut being complementally shaped to permit shifting of but to prevent the nut from turning, and said portion protruding through said aperture being deformed independently of the nut to serve as the sole means for rigidly locking the casing and hence the nut unit to the sheet metal article, the portion of said casing positioned above the top of the nut being reinforced by direct contact with the top edge of one or more of the adjacent side walls of the casing.

3. As a new article of manufacture, a nut unit of the type adapted to be clinched into position for receiving a bolt, comprising a standard nut member for receiving the bolt and a sheet metal casing permanently surrounding but spaced from said nut on the sides and having an extruded portion extending at right angles to the plane of the nut and adapted to be distorted to serve as the sole means for clinching the nut in position, at least one of said side walls being turned over to form a top enclosing wall for the nut, said turned over portion being directly backed by the top edge of an adjacent side wall of the casing to prevent said portion from clamping the nut when said extruded portion is distorted.

FREDERICK G. RICHARDSON.